United States Patent [19]

Johns

[11] Patent Number: 4,645,512

[45] Date of Patent: Feb. 24, 1987

[54] CONTINUOUS PROCESS FOR REMOVING WATER-SOLUBLE PARTICLES FROM ORGANIC LIQUIDS

[75] Inventor: Dennis M. Johns, Midland, Mich.

[73] Assignee: The Dow Chemical Company, Midland, Mich.

[21] Appl. No.: 730,531

[22] Filed: May 6, 1985

[51] Int. Cl.[4] ............................................. B01D 11/04
[52] U.S. Cl. .................................. 23/293 R; 210/634; 208/251 R
[58] Field of Search ....................... 23/293 R; 210/634; 208/251 R

[56] References Cited

U.S. PATENT DOCUMENTS

| | | |
|---|---|---|
| 679,575 | 7/1901 | Reese . |
| 1,951,787 | 3/1934 | Child et al. . |
| 2,091,078 | 8/1937 | McKittrick et al. . |
| 2,273,915 | 2/1942 | Wellman . |
| 2,327,996 | 8/1943 | Burnam . |
| 2,785,120 | 3/1967 | Metcalf . |
| 2,813,781 | 11/1957 | Mertes . |
| 2,852,349 | 9/1958 | Hicks et al. . |
| 3,468,633 | 9/1969 | Honchar . |
| 3,480,332 | 11/1969 | Kuhre et al. . |
| 3,598,718 | 8/1971 | Gleim et al. . |
| 3,983,032 | 9/1976 | Hess et al. . |
| 4,090,957 | 5/1978 | Leonard . |
| 4,118,313 | 10/1978 | Hadamovsky et al. ............ 210/634 |
| 4,161,439 | 7/1979 | Warren et al. . |
| 4,180,456 | 12/1979 | Moll et al. . |
| 4,221,658 | 9/1980 | Hardwick . |
| 4,246,241 | 1/1981 | Matthur et al. . |
| 4,416,767 | 11/1983 | Jordan . |
| 4,424,131 | 1/1984 | Baird . |

FOREIGN PATENT DOCUMENTS 152991 8/1984 Japan .

Primary Examiner—David L. Lacey

[57] ABSTRACT

A process for the removal of water-soluble particles from a heavier-than-water organic liquid which easily emulsifies with water, comprising conducting a countercurrent extraction with water in a vertical extraction zone wherein an organic phase is maintained as a continuous phase and the water migrates upwardly through the organic liquid as a disperse phase.

8 Claims, 2 Drawing Figures

CONTINUOUS PROCESS FOR REMOVING WATER-SOLUBLE PARTICLES FROM ORGANIC LIQUIDS

BACKGROUND OF THE INVENTION

This invention relates to a process for removing fine suspensions of water-soluble solids from organic liquids which are more dense than water and which readily form an emulsion with water.

Various approaches have been used in the prior art to remove finely divided, suspended particulate material from organic liquids. The suitability of a particular approach depends both on the nature of the particulate material to be removed and the nature of the organic liquid. Certain processes have been shown to be more effective than others. Simple extraction and countercurrent extraction have long been known in the art. However, these methods possess serious disadvantages in that when it is desired to remove an extractable material from an organic liquid which readily forms an emulsion with water, water cannot be used as the extracting agent in an agitated system without the addition of some other material which will prevent the formation of an emulsion or cause a formed emulsion to resolve. The addition of an agent to aid in resolving such an emulsion has the disadvantage of adding additional material to the system which must eventually be removed and is inefficient because additional steps in the extraction process are required. Another class of separation processes, filtration, are also well known in the art. In general, alternate filtration approaches have been employed such as basket centrifugation and solid bowl centrifugation. Basket and solid bowl centrifugation are not suitable when high purity and efficiency is required because they can exhibit only 96% efficiency and 98.5 efficiency, respectively. Filtration per se, although effective in removing large particulate matter, is not entirely satisfactory when a liquid organic product with extremely fine particulate material suspended therein is involved because such particulate material cannot readily be removed by this expedient. Therefore, wash or extraction processes are often employed to purify such organic liquids.

Conventionally, in countercurrent extraction processes the more viscous phase is dispersed in the less viscous phase. This achieves small droplet size distribution, which normally correlates to better and more complete mass-transfer. This prior art approach, however, does not yield satisfactory results with heavy organic hydrocarbons containing extremely fine particulate matter suspended therein because an insufficient quantity of the particulate material is extracted.

U.S. Pat. No. 679,575 discloses a countercurrent method and apparatus for extracting matter from liquids. The apparatus includes an extraction column which has an inlet and an outlet at both the upper and lower portions of the column. The system is operated such that both the extracting liquid and the liquid containing matter to be extracted is introduced into the column in a finely divided form. This finely divided form is maintained throughout a substantial length of the column. Agitation means is provided for maintaining the two phases in intimate, finely divided contact. Such a system is unsuitable for extracting water soluble suspended particulate matter from a liquid which readily forms an emulsion with water.

U.S. Pat. Nos. 1,951,787; 2,273,915; 2,852,341; 4,221,658 and 4,424,131 disclose various modifications of this general type of process. However, none is practical for use with a liquid which readily forms an emulsion of water.

Countercurrent extraction of water-soluble particles from heavier-than-water organic liquids is normally carried out in a vertical extraction column with the conditions of the extraction controlled such that the liquid/liquid interface is maintained near the bottom portion of the column and thus the organic liquid is maintained as the discrete phase. The object of such prior art processes is to achieve small droplet size distribution which normally results in better, more complete mass transfer. However, when the prior art processes are carried out on highly viscous organic liquids which readily form an emulsion with water, removal of the water-soluble particles contained in the organic phase is not satisfactory.

It has been found, when the water-soluble particles are, e.g., solid NaCl, that in dissolving the particles from the organic phase using water, the resultant system is a three component system, viz., (1) a highly viscous organic liquid (2) a particulate phase suspended in the organic phase and (3) an immiscible aqueous phase. The prior art approach of maintaining the organic liquid as a discrete phase is unsatisfactory at least in part because the particulate phase is not free to move in the organic phase. Thus, adequate contact between the particles to be dissolved and the water is not achieved. In the case of an organic liquid which readily emulsifies with water, improved water-particle contact cannot be obtained by agitation since an emulsion results.

The present invention overcomes the prior art difficulties by maintaining the water as the disperse phase so that particle-water contact is carried out more efficiently.

OBJECTS OF THE INVENTION

Accordingly, it is an object of this invention to provide a process whereby water-soluble particles can be removed from a heavier-than-water organic liquid which readily forms an emulsion with water.

A further object of this invention is to provide a process whereby very fine water soluble particles suspended in a heavier-than-water organic liquid can readily and substantially completely be removed therefrom.

A further object of this invention is to provide a process wherein the water-soluble particles are removed from the organic liquid at high flow rates.

Yet a further object of this invention is to provide an aqueous countercurrent liquid/liquid extraction process wherein the formation of an emulsion is avoided.

Upon further study of the specification and appended claims, further objects and advantages of this invention will become apparent to those skilled in the art.

SUMMARY OF THE INVENTION

The foregoing objects are attained according to this invention by introducing into an extraction zone which contains an organic liquid (carrier liquid) as a lower discrete layer and a body of water as an upper discrete layer thereover, a stream of the organic liquid containing water-soluble particles therein into the upper portion of the body of organic liquid and introducing a stream of water as a discontinuous phase into the lower portion of the body of the organic liquid in the extraction zone, withdrawing water from the upper portion of the extraction zone and withdrawing from the bottom portion of the extraction zone organic liquid from which at least a portion of the particles have been removed at respective rates which maintain the liquid/liquid interface between the body of water and the body of liquid in the upper portion of the extraction zone; whereby water passes through the body of organic liquid in countercurrent relationship thereto and dissolves water-soluble particles therein while passing therethrough.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DETAILED DISCUSSION

The process of the invention is particularly suitable for the removal of water-soluble particles from heavier-than-water organic liquids which readily form an emulsion with water. Such liquids are often quite viscous and the water soluble particles are not mobile therein. When such organic liquids are subjected to extraction with water, a three phase system results such that the organic liquid comprises one phase, the extracting water comprises another phase and the solid, relatively immobile solids comprise a third phase.

The water soluble particles can have an average diameter ranging from about 0.1 to 2.0 um; e.g., about 1 um. The organic liquid can have a viscosity in the range of from 0.2 to 50 cp. and a typical density in the range of from 1.05 to 2.0 g/cm$^3$ when surface active, they can have surface tension in the range of 2 to 60 dynes/cm$^2$. The organic carrier fluid can be any type of heavy synthetic or natural organic compound, e.g., halogenated or petroleum hydrocarbon, having the above physical properties.

The organic liquid (carrier fluid) ideally has very limited solubility in water (i.e., less than 2.0 weight percent) and can be any one of a number of common organic solvents or other synthesized organic compounds. A specific example of a common organic solvent is 1,2-dichlorobenzene and a specific example of a synthesized organic compound is [2-(4-(3-chloro-5-trifluoromethyl-2-pyridyloxy)phenoxy)propionic acid] methyl ester.

The particles contained in the organic liquid can be any water-soluble material, such as an ionic salt, e.g., particles consisting of or comprising an alkali metal halide, e.g., NaCl.

The water soluble particles can be present in the organic liquid at a concentration of up to 50% by weight, e.g., about 1 to about 20% by weight.

Figure 1:
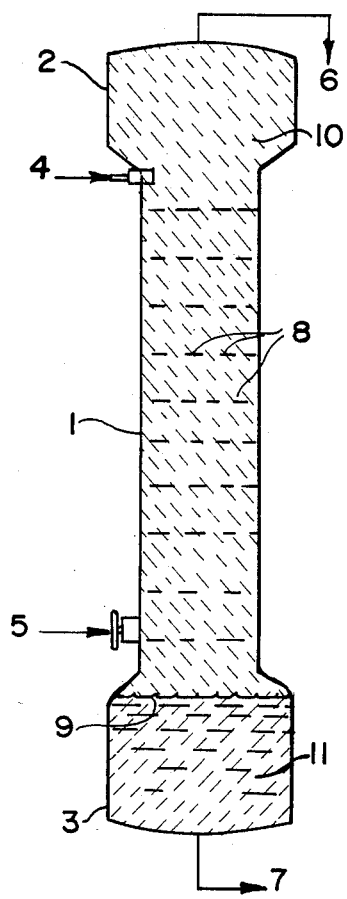
FIG. 1 is a schematic representation of a typical prior art countercurrent extraction process.

FIG. 1 schematically represents a typical prior art process. Numeral 1 designates generally an extraction column which defines an extraction zone having a top portion 2 and a bottom portion 3. An inlet 4 is provided at the top portion of the extraction zone for introducing into the extraction zone a stream of, e.g., a heavier-than-water organic liquid containing the water-soluble particles which are to be removed therefrom by extraction with water. The extraction zone is provided with an inlet 5 at the bottom portion thereof for the introduction of a steam of extracting water. The spent water, containing the particles dissolved therein, is removed from the top portion of the column via outlet 6 and the organic liquid from which the water-soluble particles have been removed is removed via the outlet 7 at the bottom portion of the column. In this prior art process, the organic phase is a discontinuous, disperse phase throughout a substantial length of the column and the water phase 10 is the continuous phase. The liquid/liquid interface 9 remains at or near the bottom portion of the column and the organic phase does not coalesce until it reaches the bottom portion of the column, indicated generally by numeral 11.

Figure 2:
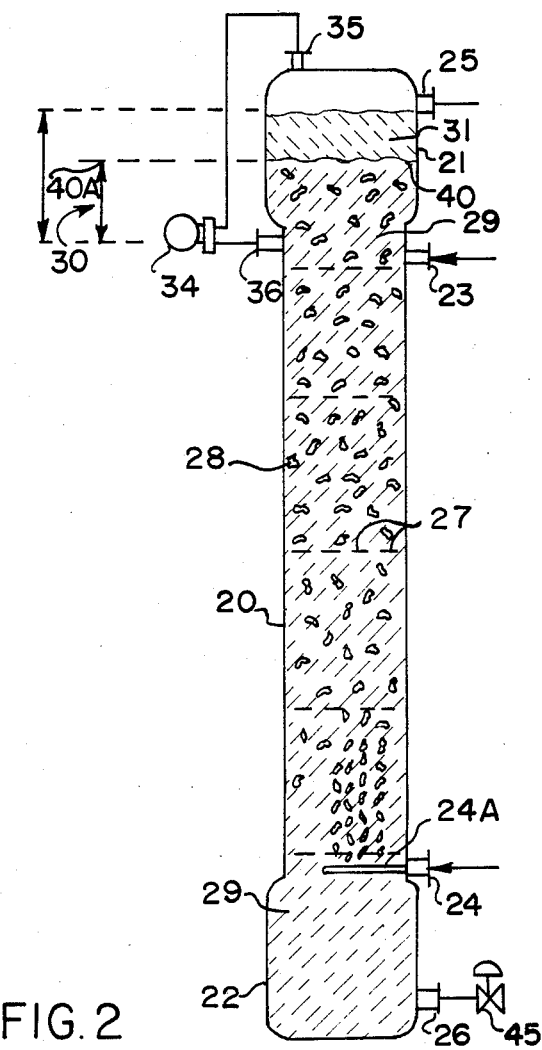
FIG. 2 is a schematic representation of a process according to the invention.

FIG. 2 schematically illustrates a process of the invention. Numeral 20 designates generally an extraction zone or column having an upper portion 21 and a lower portion 22. Upper and lower portions 21 and 22 preferably are of a substantially greater internal diameter than the internal diameter of the column. These upper and lower portions function as decanters which reduce the superficial velocity of the liquids flowing therein. This is particularly advantageous inasmuch as the organic phase is prevented from being carried over to the outlet 25, since the velocity of the disperse water phase is reduced when it enters the decanter portion 21. An upper inlet 23 is provided for the introduction of heavier-than-water organic liquid containing water-soluble particles to be removed therefrom and a lower inlet 24 for the introduction of the extracting solvent, in this case, water. An outlet 25 is provided at the top of the column for the removal of water containing dissolved therein the water-soluble particles removed from the organic liquid. An outlet 26 is provided at the lower portion of the column by means of which the heavier-than-water organic liquid from which at least a portion and preferably all of the water-soluble particles have been removed is withdrawn. The precise vertical locations of the inlets 23 and 24 and the outlets 25 and 26 are not critical. The inlet for the water is preferably provided with a suitable distributing means 24a such as a perforated pipe, spray nozzles or the like to aid in introducing the water to the organic liquid in disperse form (discontinuous phase). In the process of the invention, the organic liquid is maintained as a continuous phase 29 throughout a substantial length of the column and the water is maintained as the discontinuous phase, i.e., the water is present in the form of droplets or the like. The extraction zone is preferably provided with distribution plates 27 having a number of perforations therein. These plates serve to maintain the water as the disperse phase. The number of plates is not critical, so long as enough are used to maintain the water as the disperse phase. Instead of perforated plates, other suitable means can be employed, such as pall rings or the like. As a result, the water does not finally coalesce into a continuous phase 31 until it reaches the top portion of the column, i.e., of the extraction zone. The continuous water phase 31 and the continuous organic phase 29 define a liquid/liquid interface 40. The respective rates of spent water and purified organic liquid removal from the column are regulated so that this liquid/liquid interface 40 is maintained at the top portion of the column. Although a specific schematic illustration is shown, any extraction system capable of carrying out countercurrent extraction in a vertical extraction zone can be used.

The extraction column is provided with means to sense the location of the liquid/liquid interface 40. Preferably, the column is fitted with a pressure differential sensor 34 which senses the difference in hydrostatic pressure between one point in the column, e.g., 36 and another point in the column, e.g., 35 and generates a signal proportionate to the level of the interface 40. The pressure differential sensing means is preferably calibrated so that its output is proportionate to the amount of heavier-than-water organic liquid above sensing point 36. The signal from the sensing means can be used to control the level of the liquid/liquid interface 40. Preferably, the signal is electrically coupled to a suitable control valve 45 which governs the amount of heavier-than-water organic liquid removed via outlet 26. Thus, by controlling the rate of removal of the organic liquid, the level of the liquid/liquid interface 40 can be controlled, which control is dependent on the signal generated in response to the level of the liquid/liquid interface.

The two feed streams, i.e., the starting heavier-than-water organic liquid and extracting water, are independently controlled by a volumetric pump or some other suitable flow control means. The wastewater, discharged from the top of the column via outlet 25, is conducted to a suitable surge tank, or the like.

In carrying out the process of the invention, the extraction column may first be filled substantially completely with the heavier-than-water organic liquid containing the suspended particles. The extraction process is then initiated by the introduction of water through inlet 24. The water is preferably introduced as a stream of fine droplets, but in any event is introduced as the disperse phase. The droplets of water migrate upwardly through the continuous phase organic liquid and are maintained as a disperse phase by suitable dispersion means, such as distribution plates 27. Operating conditions are maintained such that the water phase remains as a discontinuous phase throughout a substantial length of the column and does not coalesce into a continuous phase until it reaches the liquid/liquid interface 40 at the top portion of the column. This is preferably accomplished by controlling the rate of removal of heavier-than-water organic liquid such that the liquid/liquid interface remains at the top portion of the column.

The water thus passing through the continuous organic phase contacts substantially all of the particles to be dissolved by the water and therefore dissolves all or substantially all of the water-soluble particles, at least to the extent that the resultant organic liquid contains such low concentrations of particles as to be undetectable by conventional wet chemistry. The extracted organic liquid migrates downwardly through the column and is removed therefrom, substantially free of water-soluble particles, via outlet 26. The wastewater containing the water-soluble particles dissolved therein is removed via outlet 25.

The rates at which the respective liquids can be introduced and removed from the extraction zone while maintaining the water as a disperse phase and the organic liquid as a continuous phase are generally dependent on the volumetric capacities of the vessel. This can be calculated as follows. The optimum ratio of the solvent to the organic feed rates can be determined from the solubility limit of the dissolved solids in the aqueous phase. Furthermore, it is common knowledge that as flow rates are increased in two-phase liquid-liquid systems there is a rate above which flooding is observed. This rate is typically between 500 and 1500 gallons per hour per square foot of cross-sectional area.

If a feed containing 10% by weight solids is to be washed with water to give an extract phase containing no more than 20% by weight dissolved solids the solvent to feed ratio required is 0.4. Furthermore, assuming a maximum throughput of 1000 gal/hrft$^2$ a 1 inch diameter column can process about 38 pounds per hour of feed.

In the following examples a glass column having a 1 in. internal diameter and a 10 ft. length is used. Connected to the column at the top and bottom ends thereof, respectively, are two sections having a 2 in. internal diameter and a length of 1 ft. This assembly comprises the extraction column or zone. A plurality of plates, transverse to axis of the column, are disposed along the length of the column at 6 inch intervals. Each plate has four ¼ inch holes therein. No agitation equipment is used or required.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

COMPARATIVE EXAMPLE

For comparative purposes, a heavy synthesized organic liquid (2-(4-(3-chloro-5-trifluoromethyl-2-pyridyloxy)phenoxy)propionic acid)methyl)ester) (viscosity 10 cp. surface tension 45 dynes/cm$^2$; density 1.25 g/cc) containing 16.7% NaCl suspended therein is contacted with water in a prior art countercurrent extraction process. The organic liquid is fed into the top portion of the column at a rate of 10 lbs./hr. Water is then introduced through the inlet at the bottom of the column at a rate of 25 lbs/hr. The operating conditions are controlled such that the liquid/liquid interface is maintained near the bottom portion of the column, the water phase is maintained as the continuous phase and the organic liquid is maintained as the discontinuous phase. The water, containing the dissolved water-soluble particles is removed from the top of the column and the organic phase, from which water soluble particles have been partially removed is removed at the bottom of the column. The extraction is carried out for a period of 305 minutes. The water removed from the top of the column contained an average of 4% sodium chloride. The concentration of sodium chloride in the treated organic liquid at various time intervals is shown in Table 1. The results indicate a substantial quantity of sodium chloride still present in the treated organic liquid when the liquid is treated in the normal mode of operation with the water as the continuous phase and the organic liquid as the discontinuous phase.

TABLE 1

| Time (min.) | 0 | 50 | 85 | 105 | 160 | 250 | 305 |
|---|---|---|---|---|---|---|---|
| % NaCl* | 16.7 | .66 | .32 | .19 | 14.6 | .65 | 1.67 |

*% present in the extracted organic liquid.

EXAMPLE 1

The same column as used in the comparative Example was used for Example 1. In the process of this example, the heavy synthesized organic, (2-(4-(3-chloro-5-trifluoromethyl-2-pyridyloxy)phenoxy)propionic acid)-methyl ester was maintained as the continuous phase, the water was maintained as the discontinuous phase, and the liquid/liquid interface was maintained at the top portion of the column. The column was first substantially filled with the organic liquid which contained 17.9% NaCl suspended therein. Water was then introduced through the bottom inlet at a rate of 16 lbs. per hr. and the organic liquid was introduced through the top inlet at a rate of 9 lbs. per hr. The water, containing the water-soluble particles dissolved therein was removed from the top of the column at a rate of 17.5 lbs. per hr. and the heavy organic liquid, substantially free of water-soluble particles was removed from the bottom of the column at a rate of 7.5 lbs. per hr. The extraction was carried out for approximately 270 minutes. The water removed from the top outlet of the column contained an average of 10% NaCl. The organic liquid was sampled at various time intervals and tested for the concentration of NaCl with the results as shown in Table 2.

TABLE 2

| Time (min.) | 0 | 69 | 90 | 120 | 150 | 180 | 240 | 270 |
|---|---|---|---|---|---|---|---|---|
| % NaCl | 17.9 | n.d. | n.d. | n.d. | n.d. | n.d. | n.d. | n.d. |
| (n.d. 100 ppm) | | | | | | | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for removing finely divided, water-soluble particles from a heavier-than-water water insoluble organic liquid containing the particles suspended therein, which liquid readily forms an emulsion with water, comprising:

(a) introducing into an extraction zone containing therein a body of the organic liquid as a lower discrete layer and a body of water as an upper discrete layer thereover, a stream of the organic liquid containing the water-soluble particles suspended therein into an upper portion of the body of the organic liquid;

(b) introducing a stream of water into a lower portion of the body of the organic liquid in the extraction zone as a discontinuous phase therein; and (c) withdrawing water from an upper portion of the extraction zone and withdrawing from a bottom portion of the extraction zone the organic liquid from which at least a portion of the particles have been removed, at respective rates which maintain a liquid-liquid interface between the body of water and the body of liquid in the upper portion of the extraction zone;

wherein said organic liquid is introduced and maintained as a continuous, non-dispersed phase and said stream of water is maintained as a dispersed phase while in the organic liquid; whereby water passes through the body of the organic liquid in countercurrent relationship thereto and dissolves said water soluble particles therein while passing therethrough.

2. A process of claim 1 wherein the water-soluble particles have an average diameter in the range of from about 0.1 um to about 2.0 um.

3. A process of claim 2 wherein the water-soluble particles have an average diameter of less than about 1 um.

4. A process of claim 1 wherein the water-soluble particles comprise sodium chloride.

5. A process of claim 1 wherein the organic liquid has a viscosity in the range of from 0.2 to 50 cp.

6. A process of claim 1 wherein the organic liquid has a density in the range of from 1.05 to 2.0 gm/cm$^3$.

7. A process of claim 1 wherein the water-soluble particles are present in the organic liquid at a concentration of up to 50% by weight.

8. A process of claim 1 wherein the water-soluble particles comprise sodium chloride of an average particle diameter in the range of from about 0.1 to about 2.0 um and the particles are present in the starting liquid at a concentration ranging from about 1 to about 20% by weight.

* * * * *